United States Patent [19]

Myers

[11] 4,438,592
[45] Mar. 27, 1984

[54] WICK BAR LIFT

[76] Inventor: Kenneth J. Myers, 1017 Elk St., Beatrice, Nebr. 68310

[21] Appl. No.: 378,184

[22] Filed: May 14, 1982

[51] Int. Cl.³ .............................................. A01C 15/00
[52] U.S. Cl. ........................................................ 47/1.5
[58] Field of Search ............................ 47/1.5, 1.7, 1.41

[56] References Cited

U.S. PATENT DOCUMENTS 4,208,835  6/1980  Roll et al. ............................... 47/1.5

Primary Examiner—Robert A. Hafer
Assistant Examiner—Bradley M. Lewis
Attorney, Agent, or Firm—Vincent L. Carney

[57] ABSTRACT

To apply herbicide to crop escapements, the elevation and angle of rotation of a wick bar mounted to a tractor for capillary movement of herbicide to an application surface is selected to cause the herbicide-coated surfaces to contact the escapements. A lift arm bar: (1) a wick bar at one end; (2) a cross brace driven by a hydraulic cylinder aligned at an angle to a lift arm; (3) a length beyond the crossbar sufficient so that the movement of the cross brace within the stroke range of the hydraulic cylinder is enough to cause a sweep of between 12 inches and 52 inches of change in elevation of the wick bar; and (4) sufficient strength at the crossbrace to withstand at least a hundred pound weight multiplied by two ratios, which are: (a) the extended length to the brace spacing; and (b) the cosine of the angle of the lift arm from a horizontal position to the sine of the angle the hydraulic cylinder makes with the lift arm. A chain drive having a transmission ratio from the pivot axis of the lift arm to the wick bar rotates the wick bar under the control of the operator through an angle sufficient to control the flow of liquid to the wick surface.

3 Claims, 4 Drawing Figures

WICK BAR LIFT

BACKGROUND OF THE INVENTION

This invention relates to wick bar lifts. In one class of wick bar lift, a wick bar for receiving a liquid such as a herbicide is mounted to a vehicle at a selected elevation and moved through a crop to contact escapements with an application surface of the wick bar being adjusted in angle to hit the escapements. In a prior art wick bar lift, the elevation of the wick bar is controlled by hydraulic cylinders which control a lift mechanism directly upwardly or downwardly in elevation and the angle of the wick bar is adjusted by hand by rotating it and bolting it at the selected angle.

The prior art wick bar applicators of this type have several disadvantages such as: (1) they are expensive because of the multiple use of expensive parts; (2) they are heavy in weight because of an excessive number of support mechanisms; and (3) they are inconvenient to use because of adjustments that must be made from the ground by the driver leaving the tractor and making the adjustments by hand from the ground.

SUMMARY OF THE INVENTION

Accordingly, it is an object of the invention to provide a novel wick applicator.

It is a further object of the invention to provide a novel method of controlling a wick applicator in the application of liquid to plants.

It is a still further object of the invention to provide a novel lift for a wick applicator.

It is a still further object of the invention to provide a wick applicator which is adjusted in elevation from the ground by pivoting a lift arm about a horizontal axis and adjusting the angle of the wick bar at the end of the lift arm through a connection that passes through the pivot axis and extends between controls in the driver's compartment of the vehicle carrying the wick applicator and the wick bar.

In accordance with the above and further objects of the invention, a wick bar lift which is adapted to be mounted to a vehicle includes a lift arm having first and second ends separated by a lift arm length. The lift arm includes means for pivotally mounting its first end to the vehicle for pivoting about a first horizontal axis and includes means for exerting force at a point on the lift arm which is a first distance from the first end of the lift arm and a second distance from the second end for pivoting the lift arm about the first horizontal axis to raise or lower the second end to a selected height above the ground.

The wick bar lift also includes a wick bar holder for holding a wick bar in a horizontal position at the second end of the lift arm and means for pivoting the holder about a second horizontal axis. The means for pivoting the holder about the second horizontal axis includes means passing through the first horizontal axis to rotate the wick bar and thus apply herbicide to the wick by gravity flow.

Advantageously, the wick bar lift is adapted to rotate the wick bar manually or with a hydraulic cylinder from the driver compartment and thus control the flow of herbicide to the wick. The rotation of the wick controls the flow of liquid to the wick because the wick surface is less than 180 degrees around the periphery of the wick bar and is normally not in contact with liquid. However, it can be rotated to a lower position to receive liquid and returned to its operating position. The means for exerting the force at a force point on the wick arm may be a hydraulic cylinder mounted at one end a fixed distance from the first horizontal axis and having its actuator arm mounted at the force point on the lift arm.

To provide an adequate range of elevations of the wick, the first distance along the lift arm from the first horizontal axis for the actuator arm of the hydraulic cylinder and the second distance to the end of the lift arm are selected for a particular size stroke of the hydraulic cylinder to provide a sweep of the second end of the lift arm from approximately 10 inches below the ground to 60 inches above the ground so that the operator within the tractor may adjust the elevation of the wick bar from the tractor seat.

The means for adjusting the angle of the wick bar may include a sprocket wheel attached to adjust the angle of the wick bar as it rotates and being driven by a second sprocket wheel and chain. The second sprocket wheel is aligned with the first horizontal pivot axis and is driven by a crank which may be manually operated or operated by a hydraulic cylinder. In the alternative an electric motor having the sufficient reduction rate may drive the second means for pivoting the wick bar and the cords may pass through the first horizontal pivotal axis.

Because the drive is mounted at the first horizontal pivotal axis it can be driven by a hydraulic cylinder or by a mechanical linkage from the driver's compartment. Moreover, it can be rotated through any angle while at any elevation. Because the second horizontal pivot axis is close to the longitudinal axis of the wick bar it can be rotated while only a short elevation from the ground without hitting the ground.

In operation, the vehicle is driven through the fields where it contacts escapements and spreads herbicide on them. When it is necessary to adjust the height of the wick bar to accomodate different crop heights, the first hydraulic cylinder is actuated to pivot the lift arm to the proper height. The second hydraulic cylinder is then actuated to turn the first sprocket wheel through an angle equal to the change in angle of the lift arm plus an amount of angular rotation equal to, in the case of a chain drive, the transmission factor of the chain drive times the angle that the lift arm has been rotated. In the case of a motor only the angle of change of the lift arm need be accommodated. The wick bar can be rotated to lower the wick and enable the liquid to flow into contact with it at any time.

From the above description, it can be understood that the wick bar lift of this invention has several advantages such as: (1) it is economical to construct, (2) it is relatively light, having only a few parts; (3) it permits the ready adjustment of both the height of the wick bar and its angle from the driver's seat of the vehicle carrying it using either a mechanical linkage or a hydraulic control or an electrical control; and (4) the wick can be rotated to apply liquid to the wicks while in any elevation.

SUMMARY OF THE DRAWINGS

The above noted and other features of the invention will be better understood from the following detailed description when considered with reference to the accompanying drawings in which.

DETAILED DESCRIPTION

Figure 1:
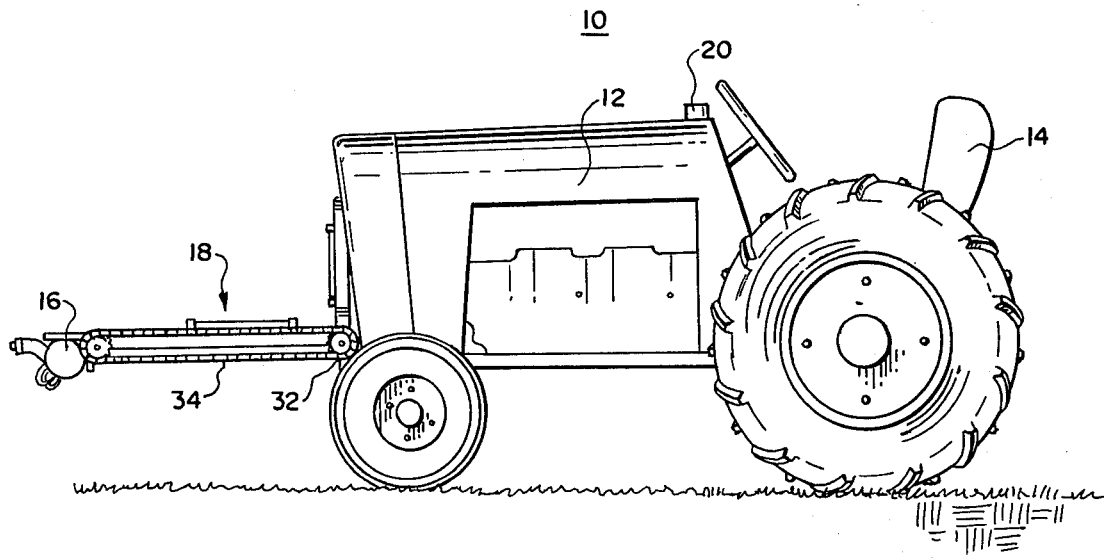
FIG. 1 is a simplified side elevational view in accordance with an embodiment of the invention.

In FIG. 1 there is shown a tractor-mounted wick bar applicator 10 including a tractor 12, a wick bar 16 and a wick bar positioner 18.

The wick bar 16 is mounted to be carried by the tractor 12 for application of herbicide or the like to plant life in the path of the tractor 12. The tractor may be any convenient type of tractor to which the wick bar positioner 18 may be mounted for positioning at selected heights and to be rotated about its axis to bring a selected surface of the wick bar 16 into contact with escapements.

The wick bar 16 may be raised or lowered or rotated to control the position of the wick with respect to the fluid in it from a set of controls 20 within the driver's compartment of the tractor 12. Without leaving the driver's seat, the driver may control: (1) the flow of herbicide to the wick of the wick bar 16 by rotating the wick bar 16 about its axis; or (2) the elevation of the wick bar 16 to contact escapements at a certain angle and height. The rotation of the wick bar may be controlled through a mechanical linkage or hydraulically. In the preferred embodiment the wick bar is filled directly but a tank 14 containing herbicide may be connected to it by a valve and conduit to fill it from the driver's compartment by opening the valve while the bar is lower than the tank 14.

Figure 2:
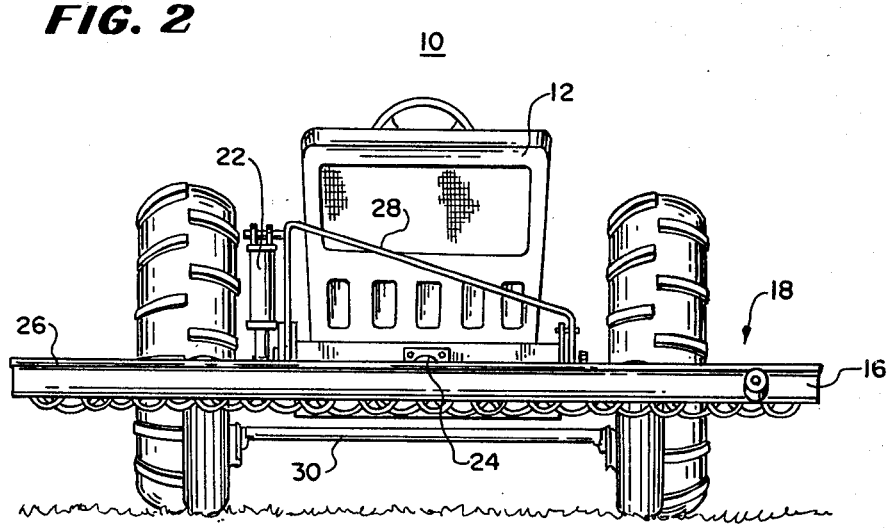
FIG. 2 is a front elevational view of the embodiment of the invention of FIG. 1.

In FIG. 2, there is shown a front elevational view of the tractor 12, wick bar 16 and wick bar positioner 18 having a first hydraulic cylinder 22, a second hydraulic cylinder 24, a wick bar angle support 26, a first hydraulic cylinder support bracket 28, and a mounting base assembly 30.

The first hydraulic cylinder 22 which is mounted to the first hydraulic cylinder support bracket 28 is a means for rotating the wick bar 16 about its axis to provide a wick surface for contacting escapements. The second hydraulic cylinder 24 is mounted to the mounting base assembly 30 and serves to control the elevation of the wick bar 16 so that it may be positioned above the crop to contact escapements but not the crop. The wick bar angle support 26 pivotally mounts the wick bar cylinder for rotating, raising and lowering the wick bar 16.

In operation, the driver permits sufficient flow of herbicide or other chemical to moisten the wick in the wick bar 16 and adjusts the height of the wick bar 16 by causing the second hydraulic cylinder 24 to adjust its stroke, pivoting the wick bar 16 about the pivot axis 32 so that it is lifted up by the lift arm assembly 34 (FIG. 1) to the desired height. Next the first hydraulic cylinder 22 is adjusted to rotate the wick bar 16 so that the wicks are low and liquid contacts them and they then are raised so they are facing the line of contact of the escapements.

When required the wick bar may be adjusted in angle and elevation above the ground. It may be quickly lowered or raised and the angle automatically adjusted by rotating the wick bar 16 about its own longitudinal axis through the same angle that the lift arm assembly 34 is raised.

In the preferred embodiment, the wick bar positioner 18 is mounted to position the wick bar 16 within a range of heights from the ground of between 12 inches and 52 inches to provide a range of 40 inches from the lower most position to the highest position with accompanying ability to rotate the wick bar 16 about its axis to face the proper direction. The apparatus contemplates wick bar lifts with different ranges of elevational adjustments according to circumstances within a 50-inch range of between 10 inches above the ground to 60 inches above the ground.

Figure 3:
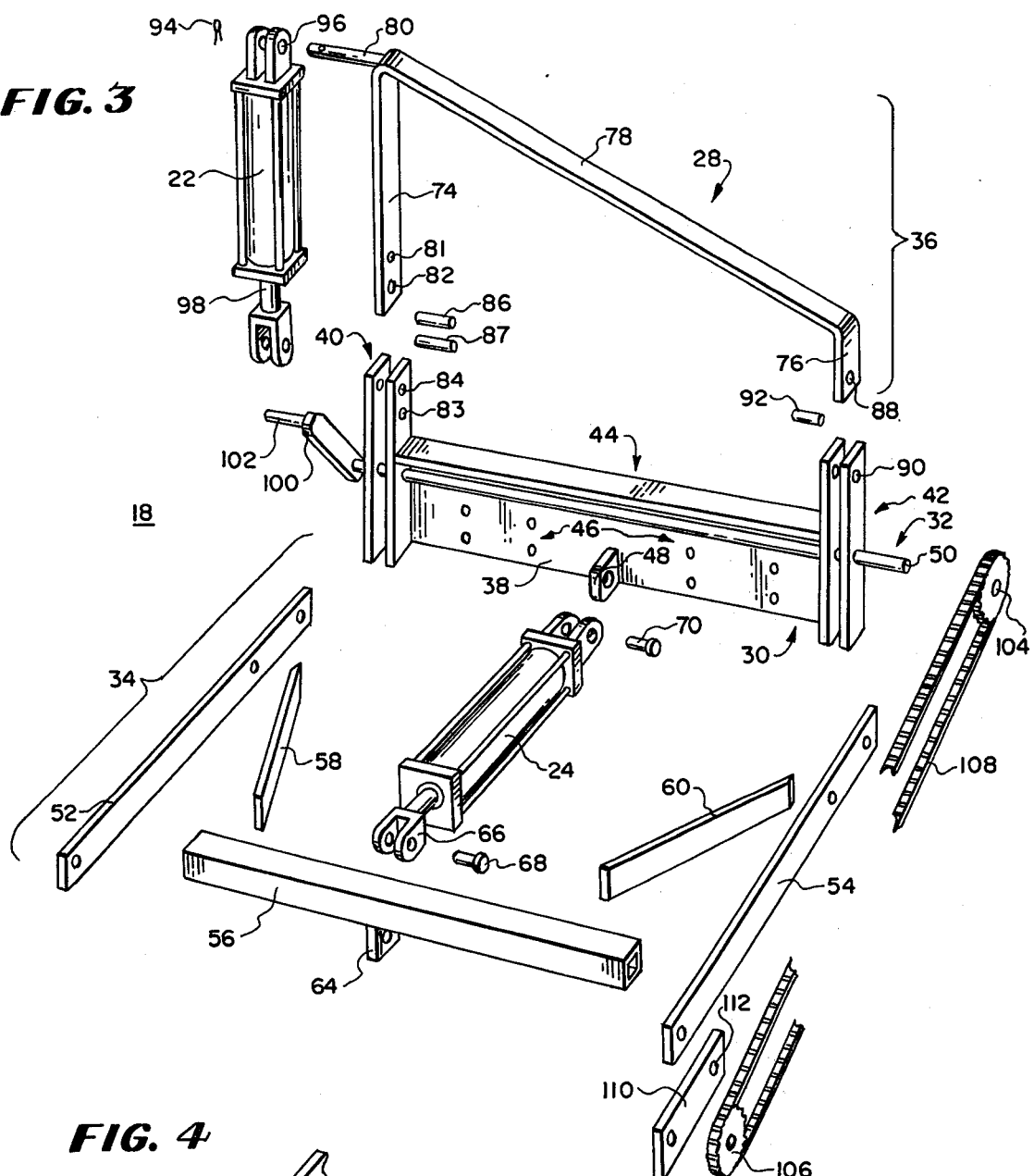
FIG. 3 is an exploded, simplified perspective view of a portion of FIG. 1 and FIG. 2.

In FIG. 3, there is shown an exploded simplified perspective view of the wick bar positioner 18 showing separately the parts of the lift arm assembly 34, the mounting base assembly 30 and a wick bar angle adjustment assembly 36. The lift arm assembly 34 and the wick bar angle adjustment assembly 36 cooperate together to form a means for lifting the wick and a means for adjusting its angle, both being mounted to the mounting base assembly 30.

To mount the means for lifting the wick and the means for adjusting its angle to the tractor 12 (FIGS. 1 and 2), the mounting base assembly 30 includes a base plate 38, a right-hand vertical support 40, a left-hand vertical support 42 and a horizontal support 44.

The base plate 38 is approximately 27 inches long and 8 inches high and $\frac{3}{8}$ of an inch in thickness, with its thick flat side being placed against the tractor 12 (FIGS. 1 and 2). It contains a plurality of both mounting holes such as those shown at 46 for mounting to different tractors. The holes are positioned to mount to different models of tractors and slightly different base plate sizes may be used to accommodate such tractors.

On the right-hand side of the base plate 38 (left-hand side facing the paper but right-hand side of a front mounted wick bar positioner) the right hand vertical support 40 includes two parallel plates spaced $\frac{3}{8}$ of an inch apart, each being $\frac{3}{8}$ of an inch in thickness with the outer one being spaced $\frac{3}{8}$ of an inch from the edge of the base plate 38. Both have their inner edges fastened to the base plate 38 such as by welding to form parallel supports for accommodating the lift arm assembly 34 and wick bar angle adjustment assembly 36.

Similarly, on the left-hand side of the base plate 38, the left-hand vertical support 42 includes two parallel plates of the same size and spaced in the same way as the right-hand vertical support 40. Between the two plates is the horizontal support 44 which in the preferred embodiment includes two parallel plates $\frac{3}{8}$ of an inch thick and spaced $\frac{3}{8}$ of an inch from each other to provide additional support although, in some of the stronger configurations, these plates may be omitted.

The center of the base plate 38 includes an outwardly extending mounting member 48 having an aperture through it for pivotally mounting one end of the second hydraulic cylinder 24. Between the two parallel horizontal supports 44, is mounted an axle 50 which passes through aligned apertures in the right-hand vertical support 40 and the left-hand vertical support 42. Above the horizontal supports 44 are aligned holes in the right and left-hand vertical supports 40 and 42 for mounting the wick bar angle adjustment assembly 36.

The four plates which form the right and left-hand vertical supports 40 and 42 are in general approximately $2\frac{1}{2}$ inches wide, $\frac{3}{8}$ of an inch thick, approximately 7 inches to the first set of apertures for mounting the lift arm assembly 34, approximately 2 inches to the horizontal supports 44 and approximately $4\frac{1}{4}$ inches to the apertures for the first hydraulic cylinder support bracket 28, there being two parallel apertures in each side for that purpose. The total height in the preferred embodiment is 14 inches although this height is selected for the particular purpose and the dimensions may vary from situation to situation.

The lift arm assembly 34 includes right and left-hand lift arms 52 and 54, a cross support 56, right and left-hand braces 58 and 60 and the second hydraulic cylinder 24.

The right and left-hand lift arms 52 and 54 are generally steel plates: (1) 34 inches long extending outwardly from the mounting base assembly 30; (2) having $\frac{1}{2}$ inch thicknesses positioned between the plates of the right and left-hand vertical supports 40 and 42, with the right lift arm 52 being positioned between the two plates of the right-hand vertical support 40 and the lift arm 54 being positioned between the two parallel vertical plates of the left-hand vertical supports 42, and (3) being $2\frac{1}{2}$ inches wide with their width extending vertically so as to pivot within aligned apertures approximately 7 inches from the bottom of the base plate 38 parallel to each other along the pivot axis indicated at 50.

To raise or lower the wick bar 16 (FIGS. 1 and 2), the right and left-hand lift arms 52 and 54 are each pivotally connected to a different one of the right and left-hand vertical supports 40 and 42 by the axle 50 aligned with the first horizontal pivot axis. At their opposite ends they carry the wick bar 16 to cause the wick bar 16 to orbit through an arc about the first horizontal pivot axis 50 approximately 34 inches from the axis as will be described more fully hereinafter.

The cross member 56 is a steel 2-inch by 2-inch tube 24 inches long and welded at its ends between the surfaces of the right and left-hand arms 52 and 54 to extend orthogonally therebetween approximately $24\frac{1}{2}$ inches from the base plate 38 in the preferred embodiment. Centered along its longitudinal axis is a 2-inch downwardly extending ear 64 having an aperture through it aligned with a longitudinal axis of the cross member 56 and adapted to pivotally connect one end of the acutator arm of the second hydraulic cylinder 24 as shown at 66 and be bolted thereto by bolt 68 for pivotal motion therewith.

To pivot the lift arm assembly 34 upwardly and downwardly, the second hydraulic cylinder 24 has its other end pivotally mounted by a bolt 70 or other means to the outwardly extending mounting member 48 and has in the preferred embodiment an 8-inch acutator stroke. It must be capable of imparting the stroke with sufficient force to lift the wick arm as will be described hereinafter. In the preferred embodiment, the wick bar 16 when loaded weighs approximately 100 pounds but it may vary in weight between 20 pounds when loaded and 200 pounds.

The right and left-hand braces 58 and 60 each have one of their ends welded to a corresponding one of the right and left-hand lift arms 52 and 54 approximately 7 inches from the base plate 38. At their opposite ends, the right and left-hand braces 58 and 60 are each welded to the cross member 56 approximately 10 inches from the corresponding one of the right and left-hand lift arms 52 and 54. They are generally 20 inches in length and $\frac{1}{4}$ of an inch thick and 2 inches wide with their lengths extending between the right and left-hand arms 52 and 54 and their corresponding locations on the cross member 56.

The distance between the bolt 70 for the second hydraulic cylinder 24 and the first horizontal pivot axis 62, hereinafter called the pivot spacing, is selected in relation to the distance between the bolts 72 and 74 and the cross member 56 hereinafter called the brace spacing and the distance between the ear 64, called the force point and the wick connected to the outer edges of the right and left-hand lift arms 52 and 54, hereinafter being referred to as the extending length, with the total of the brace spacing to the force point and the extended length from the force point to the end being referred to hereinafter as the lift arm length.

The bolt and ear connection of the hydraulic cylinder can be above or below the first horizontal pivot axis 50 but in the preferred embodiment it is below it and the dimensions are selected to provide a reasonable strength at a reasonable weight of the wick bar 16 (FIGS. 1 and 2) within a selected range of wick bar elevations. In the preferred embodiment the wick may be raised or lowered through an elevation of 40 inches but in general the elevational adjustment which is necessary will be less than 50 inches between 10 inches to 60 inches from the ground.

Within this range of elevations of the wick bar 16, the second hydraulic cylinder 24 moves in a vertical plane carrying with it, each in its own vertical plane of movement, the right and left-hand lift arms 52 and 54. The hydraulic cylinder 24 pivots at its outer ends as it extends its actuator arm or retracts its actuator arm with the pivoting being in the vertical plane, perpendicular to the first horizontal pivot axis 50.

The elevation of the wick bar 16 is a function of the pivot spacing, the base spacing, the base spacing and the extended length. It may also be considered a function of the lift arm length and the sine of the angle above or below the horizontal of the lift arm, which angle is controlled by the amount of extension or retraction of the actuator arm of the second hydraulic cylinder 24.

To obtain a maximum stroke in elevation of the wick bar 16 with a minimum amount of range of the actuator arm, the pivot spacing is made short, the base spacing is made short and the extended length is made long but this requires stronger members in the pivot. The longer the lift arm length, the greater the elevation for a given angle from the horizontal of the lift arm.

The strength of the joints at the first horizontal pivot axis 50 and at the joint 64 must be sufficient to support a portion of the weight of the wick bar 16 loaded with fluid plus the distributed weight of the members and to withstand jolts from accidental contact with the ground. The force on the joint 64 is substantially equal to the weight of the wick and other elements multiplied by the product of the lift arm length and the cosine of the angle from the horizontal of the lift arm assembly 34 divided by the product of the brace spacing and the sine of the angle between the second hydraulic cylinder 24 and the lift arm assembly 34. The force on the lift arm assembly 34 which is equal to the force on axle 50 and is substantially equal to the weight of the filled wick and distributed weight of the lift arm assembly 34 multiplied by the square root of the sum of two terms. The first term is equal to the cosine squared of the angle of the lift arm with the horizontal multiplied by the square of a sum of two terms, which are: (1) the lift arm length divided by the brace spacing and (2) a negative one. The second term is the square of the difference between the sine of the lift arm angle with the horizontal and the product of two quantities which are: (1) the lift arm length divided by the brace spacing and (2) the sine of the lift arm angle with the horizontal divided by the tangent of the angle of incidence of the second hydraulic cylinder 24 with the lift arm assembly 34.

The amount of the adjustment in angle of the wick as the lift arms are raised from the horizontal in the preferred embodiment is the sum of the angle of the lift arms from the horizontal plus an additional angle where a chain and sprocket are used equal to the angle of the lift arm from the horizontal multiplied by a transmission factor which is the ratio of the diameters of the sprocket wheels.

The wick bar angle adjustment means includes the wick bar angle adjustment assembly 36, a transmission system and the articulated support for the wick bar 16 to be described hereinafter.

To support the first hydraulic cylinder 22, the wick bar angle adjustment assembly 36 includes a first hydraulic cylinder support bracket 28 having a first vertical plate 74, a second vertical plate 76, a horizontal angled plate 78 and a mounting plate. The vertical plate 74: (1) is ½ inch thick so as to fit between the two parallel plates of the right-hand vertical support 40; (2) is 1½ inches wide, with its edge abutting the base plate 38; (3) has apertures 81 and 82 aligned with apertures 83 and 84 in the two parallel plates of the right-hand vertical support 40 to receive bolts or pins 86 and 87 for mounting the first vertical plate 74; and (4) extends above the right-hand vertical support 40. Similarly, the second vertical plate 76: (1) is ⅜ inch thick to fit between the two parallel plates with washers of the left-hand vertical support plates 42; (2) has an aperture 88 alignable with apertures 90 in the left-hand vertical support 42 to receive a bolt 92 and washers for mounting the plates therein; (3) is 1½ inches wide; and (4) extends above the right-hand vertical support 40.

The plates 78, 74 and 76 are integrally formed such as by bending. To the top of horizontal angled plate 78 is mounted the stub shaft 80 welded horizontally outward to pass through retainer ring 94 after passing through aligned holes in an ears 96 on the first hydraulic cylinder 22.

With this mechanism, the wick bar angle adjustment assembly 36 mounts the first hydraulic cylinder 22 with its actuator arm 98 extending downwardly to pivotally engage a stub shaft 102 horizontally in aperture 100 which it moves as it is extended and retracted. The other end of the crank arm 102 is connected to the axle 50 to rotate the shaft as the actuator arm 98 is raised or lowered from the tractor 12 (FIGS. 1 and 2). At the other end of the axle 50 there is mounted a sprocket wheel 104 to be rotated with the axle 50 as the actuator arm 98 moves the crank arm 102. The axle 50 is aligned with the first horizontal pivot axis but a negligible offset could be used. A mechanical linkage may connect the crank 102 to the driver's compartment instead of the hydraulic cylinder 22.

Figure 4:
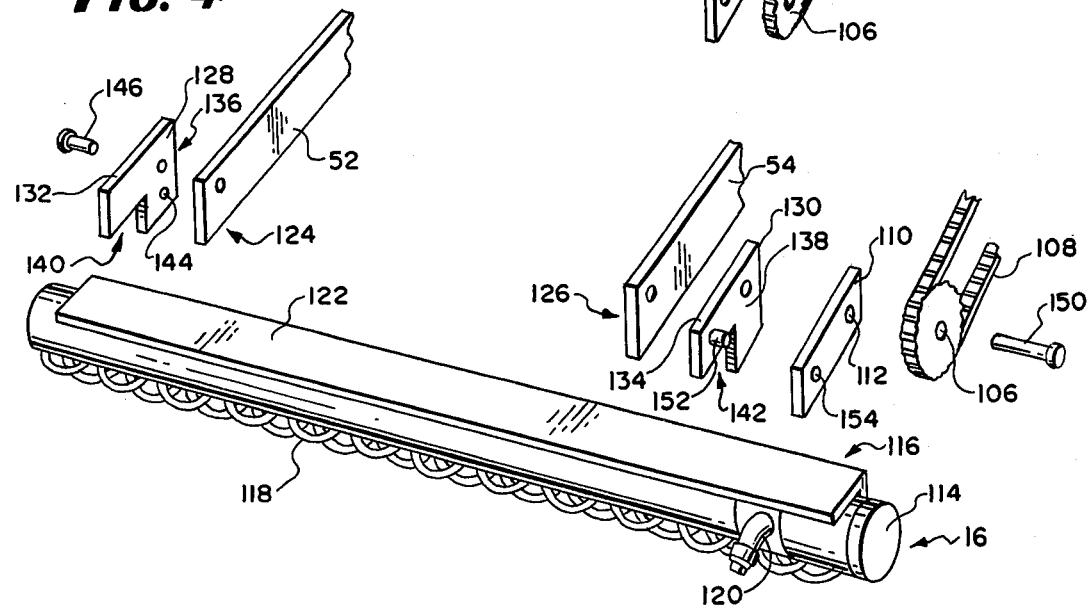
FIG. 4 is a simplified exploded perspective view of another portion of FIG. 1 and FIG. 2.

The sprocket wheel 104 drives a sprocket wheel 106 through a stainless steel chain 108 wound around the two sprocket wheels 104 and 106. The sprocket wheel 106 is welded to a sprocket plate 110 about a pin 112 to turn the plate which in turn is pivotally mounted to the end of the lift arm 54. The plate 110 is mounted to a plate 130 by a stud 152 (FIG. 4). The other end of the sprocket plate 110 is mounted by bolts to the support for the wick bar 16 (FIGS. 1 and 2) to be described hereinafter.

As the first hydraulic cylinder 22 is actuated, it turns the crank arm 102 which rotates the sprocket wheel 104 and the sprocket wheel 106 to adjust the angle of the wick bar 16 (FIGS. 1 and 2) about a second horizontal pivot axis parallel to the first horizontal pivot axis 50 (FIG. 3). For this purpose, the first hydraulic cylinder 22 is mounted to be movable in a vertical plane as it moves the crank arm 102 downwardly or upwardly. The ratio of the teeth in the sprocket wheel 104 and the driven sprocket wheel 106 is selected so that with simple downward or upward movements of the actuator arm 98, there is sufficient rotary motion to articulate the wick bar 16 (FIGS. 1 and 2) through an angle about the second horizontal pivot axis of 180 degrees.

In the preferred embodiment, the drive sprocket wheel 104 has 21 teeth and the driven sprocket wheel 106 has 16 teeth to provide a slightly greater angular rotation of the driven sprocket wheel 106 to the drive sprocket wheel 104. This increases the angular rotation by 21/16 of the rotation imparted to the axle 50 by the actuator arm 98 and is selected to provide sufficient articulation with an appropriate stroke of the first hydraulic cylinder 22.

Obviously, mechanisms other than the first hydraulic cylinder 22 and chain drive may be used to control the angle of the wick bar 16. For example, a mechanical linkage may be used to move the crank arm 102 or an electric motor may be mounted to rotate the wick bar 16 and the wires may be connected along the left-hand lift arm 54 and through the axis of rotation 50 to the cab so that, from the cab, a signal may be sent to the motor to rotate it sufficiently slowly so the driver ray adjust the angle visually. As a practical matter when such an electric motor is used, the revolutions per rinute of the motor must be less than 10 revolutions per minute to permit adequate reflex time in adjusting the angle.

In FIG. 4, there is shown the wick bar 16 having an elongated wick bar cylinder 114, a wick bar holder 116, a wick 118 and a wick bar cylinder conduit 120. The wick bar cylinder 114 fits within the wick bar holder 116 which holds it in place and receives fluids such as herbicides.

To support the wick bar cylinder 114, the wick bar holder 116 includes a support angle 122 and first and second pivotal mountings 124 and 126. The support angle 122 is a conventional angle iron having two integrally formed steel plates at right angles to each other for receiving the wick bar cylinder 114 therebetween in fixed relationship. The first and second pivotal mountings 124 and 126 are welded at spaced apart locations on the outer two sides of the support angle 122. The wick bar is held in place by stainless steel clamps.

The first and second pivotal mountings 124 and 126 each include a respective one of two pivot ears 128 and 130. The pivot ears 128 and 130 are each ½-inch thick steel plates having a 4½-inch long first edge shown at 132 and 134 for the respective pivot ears 128 and 130 and corresponding 4½-inch long edges at right angles shown at 136 and 138.

To enable fastening to the support angle 122, the edges opposite the two edges 132, 134, 136 and 138 on each of the plates are corresponding open portions 140 and 142 having right angle edges parallel to the first and second edges of each plate. They are adapted to fit on the outside surface of the support angle 122 at spaced apart locations and to be welded thereto to hold the support angle 122 firmly in place. The two pivot ears 128 and 130 are spaced from each other in the preferred embodiment approximately 26 inches and are centered on the support angle 122 which is either 12½ feet or 17½ feet in two preferred embodiments designed to accommodate two different wick bar cylinders 114. The exact size of the support angle 122 is only significant insofar as it is adapted to receive commercial wick bar cylinders 114.

To pivotally mount the pivot ears 128 and 130 to respective ones of the right and left-hand lift arms 52 and 54, the right pivot ear 128 includes an aperture 144 aligned with a corresponding aperture at the end of right-hand lift arm 52 and adapted to receive a bolt 146 to mount the right pivot ear 128 pivotally to the right-hand lift arm 52. Similarly, the left pivot ear 130 has an aperture aligned with an aperture in the end of the left-hand lift arm 54. This aperture is also aligned with the central hole in the sprocket wheel 106 and with an aperture in the sprocket plate 110 to receive the pivot bolt 150 for mounting all three elements pivotally together.

A second aperture in the end of the left pivot ear 130 includes a threaded stud 152 which engages with an aperture 154 in the sprocket plate 110. The sprocket wheel 106 is firmly mounted to the sprocket plate 110 such as by welding or the like so that it pivots as the chain 108 is driven, causing the sprocket plate 110 and the stud 152 to pivot and thus causing the left pivot ear 130 to pivot on the left-hand lift arm 54 to pivot the support angle 122 of the wick bar 16.

The wick bar cylinder 114 is a commercial type cylinder having a wick such as a nylon rope 118 glued into it to form a substantially large application surface 119 of less than 180 degrees around the total circumference of a cross-section of the wick bar cylinder 114 which is wetted by the herbicide within the wick bar cylinder 114. The herbicide or other fluid is applied to the wick bar cylinder 114 through an opening 120. Many such commercial wick cylinders are available and may be readily fastened to the support angle 122 to form the wick bar 16 used in accordance with this invention.

Before operating the tractor mounted wick applicator the proper size mounting bracket 38 is selected for the tractor 12. It is mounted by bolt holes. Manual, hydraulic, or electric motor operation is selected for the adjustment of the angle wick and hydraulic cylinders are adapted for the proper sweep such as between the range of 10 inches from the ground to 60 inches or 50-inch change in elevation. In the preferred embodiment the selection is normally from between 12 inches from the ground to 52 inches from the ground or a 40-inch sweep in elevation.

The lift arm assembly 34 is chosen to have sufficient strength so that it can support an approximately 100-pound loaded wick bar which the weight of is supported by the second hydraulic cylinder 24 at the connection to the crossbar between the right and left-hand lift arms 52 and 54 and the connection of the end of the lift arm to the tractor 12 (FIGS. 1 and 2). The fluid that is to be used can also be inserted in the tank 14 for application from the driver's compartment to the wick bar 16.

In operation, the herbicide or other liquid is permitted to flow from the tank 14 to the wick bar 16 and the height and angle of the wick bar 16 are adjusted. The vehicle is then moved across a field where the fluid on the wick 118 may contact escapements at the top of crops to apply herbicide to them or may apply other liquids to other crops as desired.

To adjust the height from the cab, the second hydraulic cylinder 24 is actuated. If the second hydraulic cylinder 24 is positioned beneath the lift arm assembly 34, its actuator arm is extended to raise the wick bar 16 and retracted to lower it. If it is positioned above the lift arms, the reverse is true.

As it is extended, it exerts a forward thrust on the joint 64 and the joint 64 must support that thrust. The force for a hydraulic cylinder mounted below the joint 64 is substantially proportional to the sine of the angle of elevation of the cylinder from horizontal and to the weight of the wick bar 16 and other equipment on it divided by the ratio of the brace length to the arm length within the normal range of elevations. This assumes a large angle of incidence of the second hydraulic cylinder 24 to the lift arm (close to 90 degrees).

Thus in construction, a ratio of brace spacing to extended spacing is selected bearing in mind that an extension of the extended length provides a wider sweep but will cause an increase in the force for a given brace spacing. Consequently, the brace spacing, the elevation to which the wick bar 16 is to be raised must be considered in determining the lift arm length and strength requirements.

As the lift arm is increased, it pivots about the pivot axis and slightly turns the wick bar 16 through an angle for a chain drive that is proportional to the transmission ratio. Once it is raised to the proper elevation, the angle of the wick bar 16 must be positioned and if it has been changed in elevation while the wick bar 16 is in its proper position, it must be rotated about the second horizontal pivot axis through the same angle that the lift arm assembly 34 was rotated about the first horizontal pivot axis 62 plus the same angle multiplied by the transmission ratio which in the preferred embodiment is 16 to 21.

If a motor is used to rotate the wick bar 16 to the proper angle about its axis instead of either a manual crank which turns a chain drive or other transmission or a hydraulic cylinder moving a crank to turn the chain drive, wires extend from the motor control through the pivot axis and up the lift arms. The motor must rotate at a sufficiently low rate to permit the viewer from the tractor to control the angle accurately with an on/off switch and generally it should be less than 10 revolutions per minute.

From the above description it can be understood that the wick bar lift of this invention has several advantages such as: (1) it is economical because it has few moving parts; (2) it is light in weight; and (3) it can be controlled manually or hydraulically by the tractor operator without leaving the tractor driver's Although a preferred embodiment has been described with some particularity, many modifications and variations in the preferred embodiment are possible without deviating from the invention. Therefore, it is to be understood that, within the scope of the appended claims, the invention may be practiced other than as specifically described.

From the above description it can be understood that the wick bar lift of this invention has several advantages such as: (1) it is economical because it has few moving parts; (2) it is light in weight; and (3) it can be controlled by the tractor operator without leaving the tractor driver's compartment.

Although a preferred embodiment has been described with some particularity, many modifications and variations in the preferred embodiment are possible without